US010602731B2

(12) United States Patent
Nagata et al.

(10) Patent No.: US 10,602,731 B2
(45) Date of Patent: Mar. 31, 2020

(54) BLOWING DEVICE

(71) Applicant: SHARP KABUSHIKI KAISHA, Sakai, Osaka (JP)

(72) Inventors: Minoru Nagata, Sakai (JP); Akihiro Yamaguchi, Sakai (JP); Takuya Shimoda, Sakai (JP); Shintaro Nomura, Sakai (JP); Tadahito Ikeda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 253 days.

(21) Appl. No.: 15/552,243

(22) PCT Filed: Feb. 24, 2016

(86) PCT No.: PCT/JP2016/055335
§ 371 (c)(1),
(2) Date: Aug. 18, 2017

(87) PCT Pub. No.: WO2016/181683
PCT Pub. Date: Nov. 17, 2016

(65) Prior Publication Data
US 2018/0070575 A1 Mar. 15, 2018

(30) Foreign Application Priority Data
May 12, 2015 (JP) .................... 2015-097373

(51) Int. Cl.
*A01M 1/06* (2006.01)
*A01M 1/08* (2006.01)
(Continued)

(52) U.S. Cl.
CPC ............... *A01M 1/06* (2013.01); *A01M 1/02* (2013.01); *A01M 1/04* (2013.01); *A01M 1/08* (2013.01);
(Continued)

(58) Field of Classification Search
CPC ............ A01M 1/04; A01M 1/06; A01M 1/08; A01M 1/14; A01M 1/106
See application file for complete search history.

(56) References Cited

U.S. PATENT DOCUMENTS 486,138 A * 11/1892 Thum et al. ............ A01M 1/14
43/114
4,519,160 A * 5/1985 McBrayer ............... A01M 1/00
43/113

(Continued)

FOREIGN PATENT DOCUMENTS

CN 201294815 Y 8/2009
CN 201370008 Y 12/2009
(Continued)

OTHER PUBLICATIONS

International Search Report of International application No. PCT/JP2016/055335 and its corresponding English Translation.

*Primary Examiner* — Christopher D Hutchens
(74) *Attorney, Agent, or Firm* — ScienBiziP, P.C.

(57) ABSTRACT

Provided is a blowing device that can provide improved convenience. In a blowing device 1 provided with a casing 2 that has openings as an air inflow port 20 and an air blow-off port 5 formed therethrough and includes a blower 10 therein, a cover member 3 that is demountably mounted to the casing 2 so as to cover the inflow port 20 and has a plurality of openings each formed therethrough as an air suction port 4, and an insect catching portion 50 that is arranged on an inner surface of the cover member 3 and catches insects, the insect catching portion 50 is formed by stacking, via a release agent, a plurality of insect catching sheets 51 each formed of a base material sheet 52 with an adhesive 53 applied on one surface thereof.

6 Claims, 12 Drawing Sheets

(51) Int. Cl.
*A01M 1/14* (2006.01)
*F24F 7/007* (2006.01)
*F04D 29/00* (2006.01)
*A01M 1/02* (2006.01)
*A01M 1/04* (2006.01)
*A01M 1/10* (2006.01)
*F04D 17/16* (2006.01)
*F04D 29/42* (2006.01)
*F04D 29/70* (2006.01)
*B01D 46/10* (2006.01)

(52) U.S. Cl.
CPC .............. *A01M 1/106* (2013.01); *A01M 1/14* (2013.01); *A01M 1/145* (2013.01); *F04D 17/16* (2013.01); *F04D 29/005* (2013.01); *F04D 29/4226* (2013.01); *F04D 29/703* (2013.01); *F24F 7/007* (2013.01); *B01D 46/10* (2013.01); *B01D 2273/30* (2013.01)

(56) References Cited

U.S. PATENT DOCUMENTS

| | | | | |
|---|---|---|---|---|
| 5,175,960 | A * | 1/1993 | Wade | A01M 1/06 43/134 |
| 6,185,862 | B1 * | 2/2001 | Nelson | A01M 1/14 43/136 |
| 6,286,249 | B1 * | 9/2001 | Miller | A01M 1/02 43/113 |
| 7,191,560 | B2 * | 3/2007 | Harris | A01M 1/02 43/107 |
| 7,748,159 | B1 * | 7/2010 | Wenner | A01M 1/24 43/114 |
| 10,091,980 | B1 * | 10/2018 | Cogley | A01M 1/023 |
| 10,091,981 | B1 * | 10/2018 | Cogley | A01M 1/223 |
| 2003/0079398 | A1 * | 5/2003 | Holmes | A01M 1/145 43/113 |
| 2004/0200130 | A1 * | 10/2004 | Klein | A01M 1/14 43/114 |
| 2005/0066570 | A1 * | 3/2005 | Mosher, II | A01M 1/02 43/139 |
| 2007/0068066 | A1 * | 3/2007 | Reatti | A01M 1/14 43/114 |
| 2011/0283597 | A1 * | 11/2011 | Coventry | A01M 1/023 43/107 |
| 2012/0096760 | A1 * | 4/2012 | Chang | A01M 1/04 43/113 |
| 2012/0204475 | A1 * | 8/2012 | Schneidmiller | A01M 1/04 43/113 |
| 2014/0068999 | A1 * | 3/2014 | Singleton | A01M 1/223 43/112 |

FOREIGN PATENT DOCUMENTS

| | | |
|---|---|---|
| JP | 2006230258 A | 9/2006 |
| JP | 2008-029206 A | 2/2008 |
| JP | 2008-035847 A | 2/2008 |
| JP | 2009-66466 A | 4/2009 |
| JP | 2011-004657 A | 1/2011 |
| JP | 2013240293 A | 12/2013 |
| JP | 2014037964 A | 2/2014 |
| TW | I262282 B | 9/2006 |
| TW | M499060 U | 4/2015 |

* cited by examiner

BLOWING DEVICE

TECHNICAL FIELD

The present invention relates to a blowing device provided with an insect catching portion that catches insects.

BACKGROUND ART

Patent Document 1 discloses a conventional blowing device. This blowing device has a casing that has an opening as an air inflow port formed through a rear surface thereof and an opening as an air blow-off port formed through an upper surface thereof. The casing is installed on a floor surface or the like in a room and includes a blower therein. A filter that collects dust in air is arranged at the inflow port. On a rear surface side of the casing, a cover member that covers the inflow port is demountably mounted with respect to the casing. The cover member has a plurality of openings each formed therethrough as an air suction port.

In the blowing device configured as above, upon a start of an operation, the blower is driven to cause air to be sucked in through the suction port. The air thus sucked in through the suction port flows into the inflow port, and after dust is collected therefrom by the filter, the air is discharged to the exterior trough the blow-off port. Thus, air in the room can be purified. Furthermore, replacement of the filter is enabled by demounting the cover member from the casing.

According to the blowing device of Patent Document 1 described above, dust in air is collected, and thus health hazards caused by dust or the like can be reduced. Furthermore, with a recent increase in health awareness, there is a growing demand for a blowing device having an insect catching function in order to reduce infectious diseases or the like mediated by insects such as a mosquito.

An insect catching device described in Patent Document 2 is provided with a casing having a front surface that is opened/closed with a door and a side surface that has an opening portion formed therethrough, an attraction light source that emits attraction light, for attracting insects into the casing, and an adhesive insect catching sheet that is arranged on a rear surface of the door and catches insects.

In the insect catching device configured as above, when the attraction light source is lit with the door closed, attraction light is emitted toward the exterior of the casing via the opening portion of the side surface. An insect enters the casing via the opening portion of the side surface and gets caught by the insect catching sheet. Then, the insect catching sheet thus used, to which a predetermined quantity of insects have adhered, is removed from the door, and an unused insect catching sheet is attached to a predetermined position on the door. Thus, replacement of an insect catching sheet can be performed.

LIST OF CITATIONS

Patent Literature

Patent Document 1: JP-A-2009-66466 (see pages 8 and 9 and FIGS. 1 and 2)

Patent Document 2: JP-A-2006-230258 (see pages 5 and 6 and FIGS. 1, 2, and 4)

SUMMARY OF THE INVENTION

Technical Problem

The insect catching device of Patent Document 2 described above, however, has presented a problem that it is troublesome and inconvenient to remove a used insect catching sheet and replace it with a new one.

The present invention has as its object to provide a blowing device that can provide improved convenience.

Solution to the Problem

In order to achieve the above-described object, the present invention is characterized in that, in a blowing device provided with a casing that has openings as an air inflow port and an air blow-off port formed therethrough and includes a blower therein, a cover member that is demountably mounted to the casing so as to cover the inflow port and has a plurality of openings each formed therethrough as an air suction port, and an insect catching portion that is arranged on an inner surface of the cover member and catches insects, the insect catching portion is formed by stacking, via a release agent, a plurality of insect catching sheets each formed of a base material sheet with an adhesive applied on one surface thereof.

According to this configuration, the blower is driven to cause air to be sucked in through the suction port and air to be discharged through the blow-off port. An insect that has entered an inner side of the cover member via the suction port is caught by the insect catching portion. The cover member is demounted from the casing, and a used one of the insect catching sheets, to which insects have adhered, is peeled off, so that an unused one of the insect catching sheets is exposed.

Furthermore, in the present invention, preferably, in the blowing device configured as above, each of the insect catching sheets has a cut to divide the each of the insect catching sheets so that the each of the insect catching sheets can be peeled off region by region.

Furthermore, in the present invention, preferably, in the blowing device configured as above, the insect catching portion is mounted to the cover member so as to be able to be inverted in an up-down direction.

Furthermore, in the present invention, preferably, in the blowing device configured as above, the adhesive is water-soluble.

Furthermore, in the present invention, preferably, in the blowing device configured as above, an odor generation portion that generates an insect-attracting odor substance is arranged in an insect catching space between the suction port and the inflow port.

Furthermore, in the present invention, preferably, in the blowing device configured as above, the odor generation portion is formed by providing the odor substance in each of the insect catching sheets.

Furthermore, in the present invention, preferably, in the blowing device configured as above, a first attraction light source is provided that emits light for attracting insects to the insect catching space between the suction port and the inflow port. In this configuration, a plurality of the suction ports are juxtaposed vertically, and the first attraction tight source is disposed above the suction ports. Further, a reflection portion is provided that diffuses and reflects emission light from the first attraction light source toward the suction ports.

Furthermore, in the present invention, preferably, in the blowing device configured as above, a second attraction light source is provided that is arranged on an outer side of the cover member and emits insect-attracting light, and timing for the first attraction light source is different from timing, for lighting the second attraction light source.

Furthermore, in the present invention, preferably, in the blowing device configured as above, the first attraction light source is mounted to the inner surface of the cover member.

Furthermore, in die present invention, preferably, in the blowing device configured as above, an annular rib that protrudes toward the inner side of the cover member is provided at a circumferential edge of the suction port, and when the blower is driven, by the rib, a vortex is formed between the suction ports on the inner surface of the cover member.

Furthermore, in the present invention, preferably, in the blowing device configured as above, there are provided a detection sensor that detects an insect passing through the suction port and an open close plate that opens/closes the suction port. In this configuration, there are provided a first blowing mode in which the blower is driven at a predetermined rotational speed and a second blowing mode in which, by the open/close plate, the suction port is made smaller in opening area than in the first blowing mode, and the blower is driven at a rotational speed larger than in the first blowing mode. Further, when, during execution of the first blowing mode, the number of insects detected within a predetermined length of time by the detection sensor has exceeded a predetermined value, switching to the second blowing mode is performed.

Furthermore, in the present invention, preferably, in the blowing device configured as above, a spray portion is provided that sprays an insecticide to the insect catching space, and in the second blowing mode, the insecticide is sprayed by the spray portion.

Advantageous Effects of the Invention

According to the present invention, the insect catching portion that catches insects is provided on the inner surface of the cover member having a plurality of openings each formed therethrough as the air suction port, and the insect catching portion is formed by stacking, via a release agent, the plurality of insect catching sheets each formed of a base material sheet with an adhesive applied on one surface thereof. Thus, when a used one of the insect catching sheets, to which insects have adhered, is peeled off an unused one of the insect catching sheets is exposed. This saves the trouble of replacing the insect catching sheets and thus can improve convenience of the blowing device.

DESCRIPTION OF EMBODIMENT

First Embodiment

Figure 1:
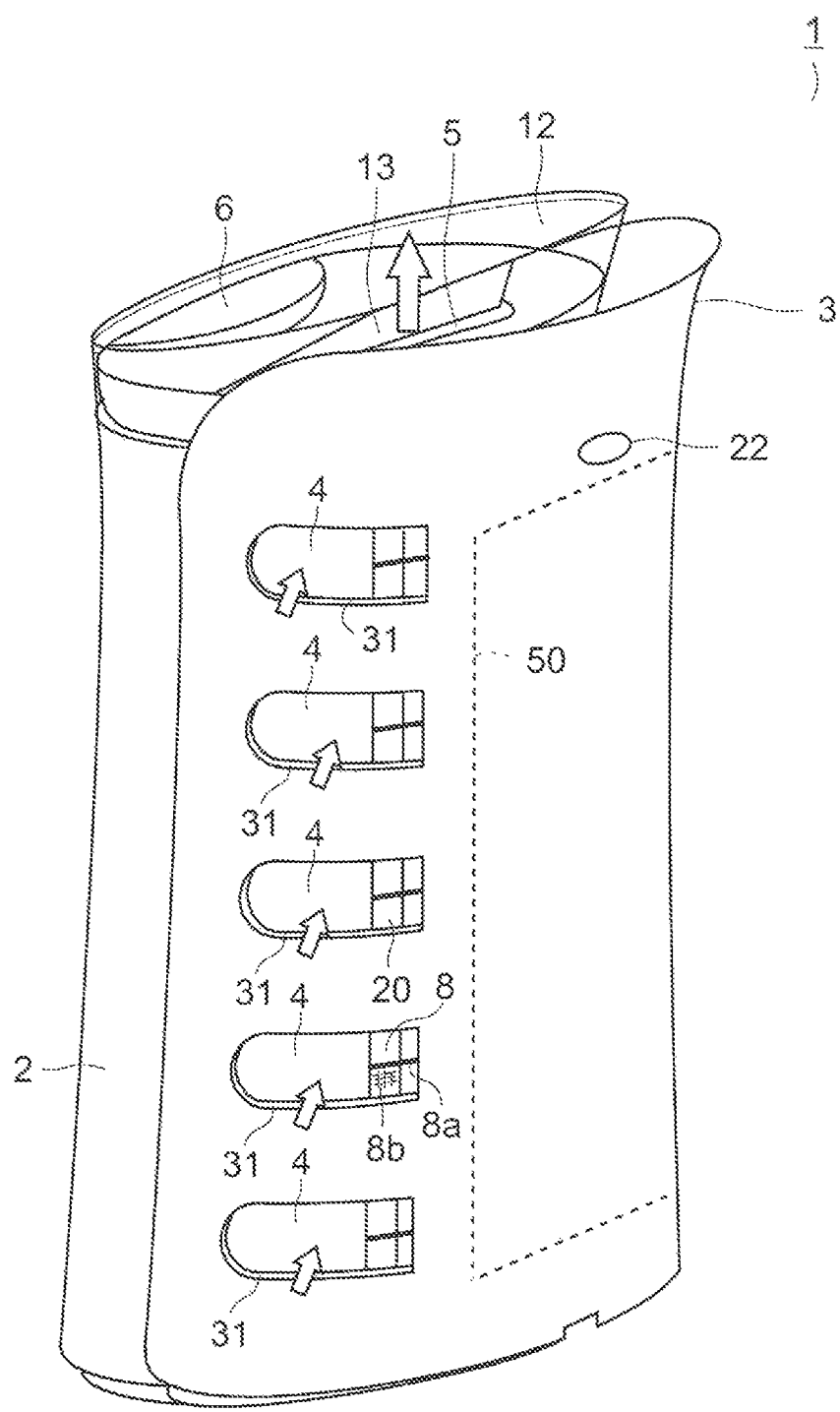
FIG. 1 is a perspective view showing a blowing device of a first embodiment of the present invention.
Figure 2:
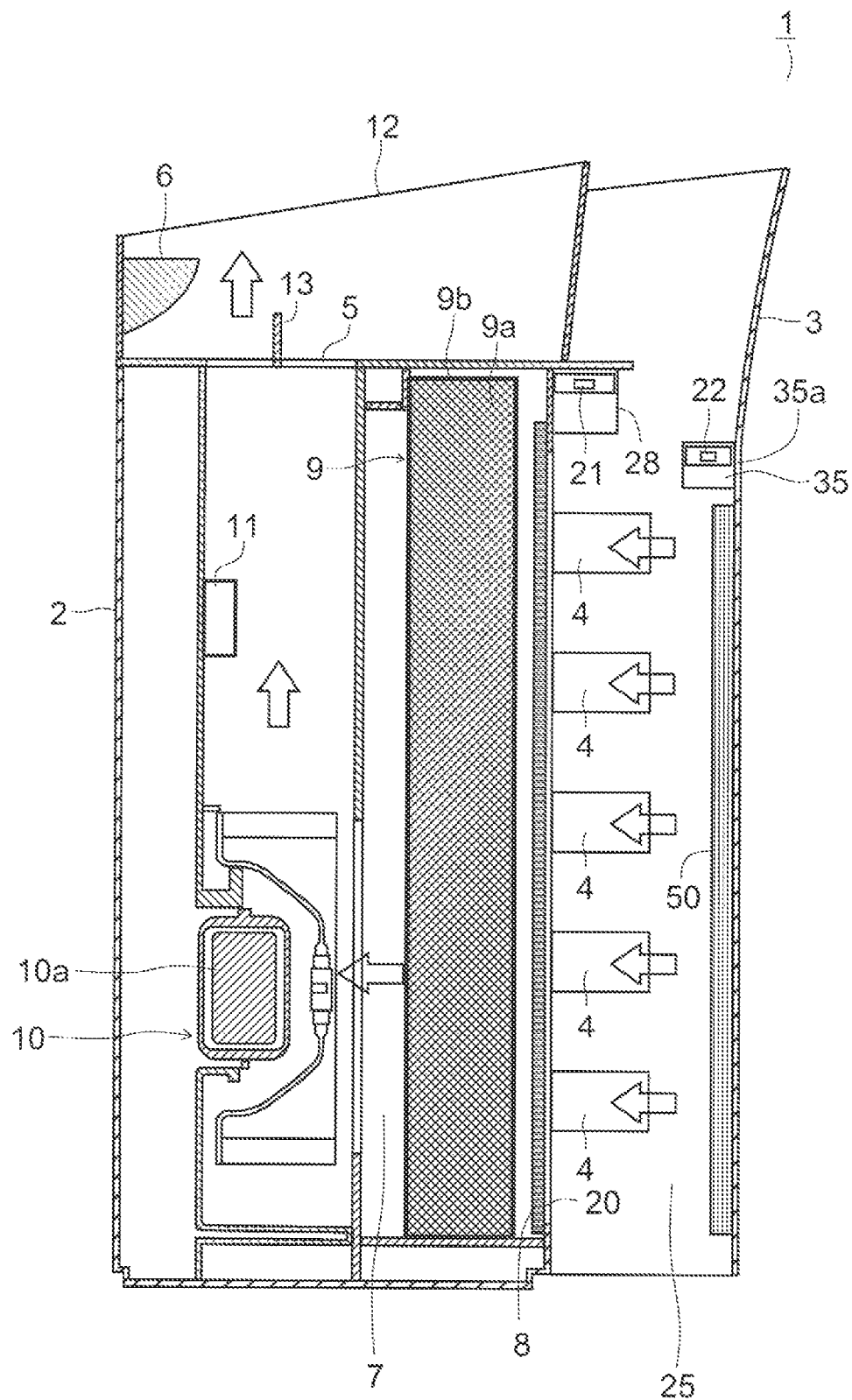
FIG. 2 is a side sectional view showing the blowing device of the first embodiment of the present invention.

With reference to drawings, the following describes an embodiment of the present invention. FIG. 1 shows a perspective view of a blowing device of a first embodiment, and FIG. 2 shows a side sectional view thereof. In FIG. 1 and FIG. 2, each hollow arrow indicates an airflow. A blowing device 1 is installed on a floor surface or the like in a room and has a casing 2 whose horizontal sectional shape is substantially elliptical. A demountable cover member 3 is mounted on a rear surface side of the casing 2, and an insect catching portion 50, which will be detailed later, is arranged on an inner surface of the cover member 3.

A sleeve portion 12 made of a transparent resin is provided in a circumferential edge portion of an upper surface of the casing 2. An operation portion 6 is provided in a front portion of the upper surface of the casing 2. The operation portion 6 has a plurality of buttons (not shown) and is operated by a user to perform operation setting for the blowing device 1. By operating the buttons, it is possible to issue instructions about driving on/off of the blowing device 1, changing of an air volume of an after-mentioned blower 10, on/off of an after-mentioned ion generator 11, and so on.

An inflow port 20 is open through a rear surface of the casing 2, and a blow-off port 5 is open through the upper surface of the casing 2. A protruding plate 13 that protrudes upward is provided in a middle portion of the blow-off port 5. The cover member 3 has a plurality of suction ports 4 formed therethrough, and between the cover member 3 and the rear surface of the casing 2, an insect catching space 25 is formed that allows the suction ports 4 and the inflow port 20 to communicate with each other.

In the casing 2, a blowing passage 7 is provided that links the inflow port 20 to the blow-off port 5. In the blowing passage 7, in order from the inflow port 20 toward the blow-off port 5 from upstream toward downstream of an airflow), a pre-filter 8, a HEPA filter 9, the blower 10, and the ion generator 11 are provided.

The blower 10 is formed of sirocco in driven by a motor 10a, sucks in air in an axial direction, and exhausts the air in a circumferential direction. The pre-filter 8 is formed by welding a polypropylene mesh 8*b* to a rectangular frame 8*a* that is made of a synthetic resin such as ABS and has a plurality of columns and rows of windows. The mesh 8*b* is formed to have such a mesh size that an insect such as a mosquito and a by cannot pass therethrough. Large-sized particles of dust in the air can be collected by the pre-filter 8.

The HEPA filter 9 is formed by welding a frame member 9*b* to a filter medium 9*a* by a hot melt process so as to cover the filter medium 9*a*. Fine particles of dust in the air including a microparticulate substance, such as PM 2.5, having a particle diameter smaller than a predetermined particle diameter (for example, 3 µm) can be collected by the HEPA filter 9.

A deodorization filter having an absorbent material such as activated carbon may be disposed between the pre-filter 8 and the HEPA filter 9. Thus, odor components M the air are absorbed, and thus the air can be deodorized.

The ion generator 11 has an electrode (not shown) that generates ions upon application of a high voltage thereto, and the electrode faces an interior of the blowing passage 7. A voltage having an alternating waveform or an impulse waveform is applied to the electrode, in a case where a positive voltage is applied to the electrode, the electrode mainly generates positive ions $H^+(H_2O)m$, and in a case where a negative voltage is applied to the electrode, the electrode mainly generates negative ions $O_2^-(H_2O)n$. Here, m and n are integers. $H^+(H_2O)m$ and $O_2^-(H_2O)n$ aggregate on surfaces of airborne bacteria or odor components in the air and surround the airborne bacteria or the odor components.

Then, as shown in Formulae (1) to (3), on surfaces of microorganisms or the like, an aggregate of [.OH] (hydroxyl radical) and $H_2O_2$ (hydrogen peroxide) that are active species is produced be collision, which destroys the airborne bacteria and so on. Here, m' and n' are integers. Accordingly, bacteria eradiation and odor removal in a room can be performed by generating positive ions and negative ions and discharging them through the blow-off port 5.

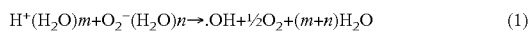  (1)

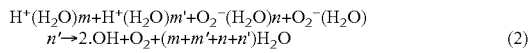  (2)

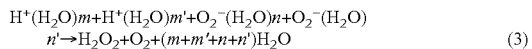  (3)

Furthermore, when positive ions and negative ions come in contact with a user's skin, a hydroxyl group (an OH group) adheres to the skin, imparting hydrophilicity to a skin surface. This makes it likely that a water molecule adheres to the skin surface and thus can moisturize the skin.

Figure 3:
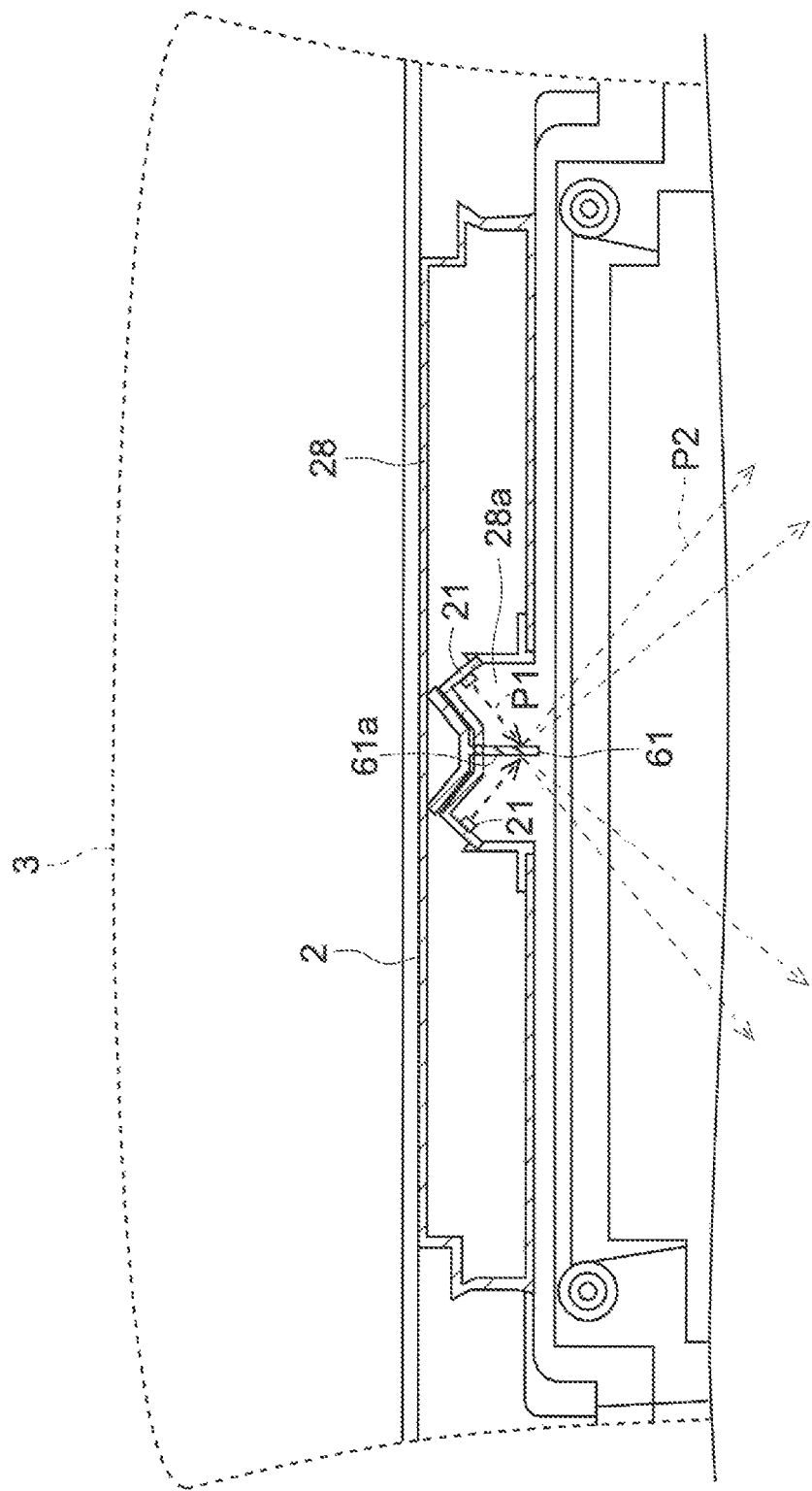
FIG. 3 is a rear sectional view showing the blowing device of the first embodiment of the present invention.

FIG. 3 shows a rear sectional view of an upper portion of the casing 2 of the blowing device 1. In the upper portion of the rear surface of the casing 2, a protruding portion 28 is provided that protrudes outward (to a cover member 3 side) with respect to the inflow port 20. The protruding portion 28 is formed to extend in a left-right direction, and a concave portion 28*a* is formed by concaving a middle portion of a lower surface of the protruding portion 28 in the left-right direction.

An attraction light source 21 is arranged at each of left and right end portions in the concave portion 28*a* so that a light emission surface (not shown) thereof faces diagonally downward. Thus, the attraction light source 21 is disposed above the suction ports 4 of the cover member 3. The attraction light source 21 has an ultraviolet light emitting diode LD1 (see FIG. 9) that emits ultraviolet light of about 365 nm, which attracts insects such as a mosquito.

In a middle portion of the concave portion 28*a* in the left-right direction, a plate-shaped reflection portion 61 having a reflection surface 61*a* formed on each of both surfaces thereof is provided in a hanging manner. The reflection surface 61*a* is grained, and light P1 emitted from the light emission surface of the attraction light source 21 is diffused and reflected on the reflection surface 61*a*. Light P2 diffused and reflected on the reflection surface 61*a* travels toward the suction ports 4. This can prevent a user from directly seeing the attraction light source 21. The attraction light source 21 and the reflection portion 61 may be provided, instead of in the casing 2, on the inner surface of the cover member 3, or in the casing 2 and the cover member 3.

Figure 4:
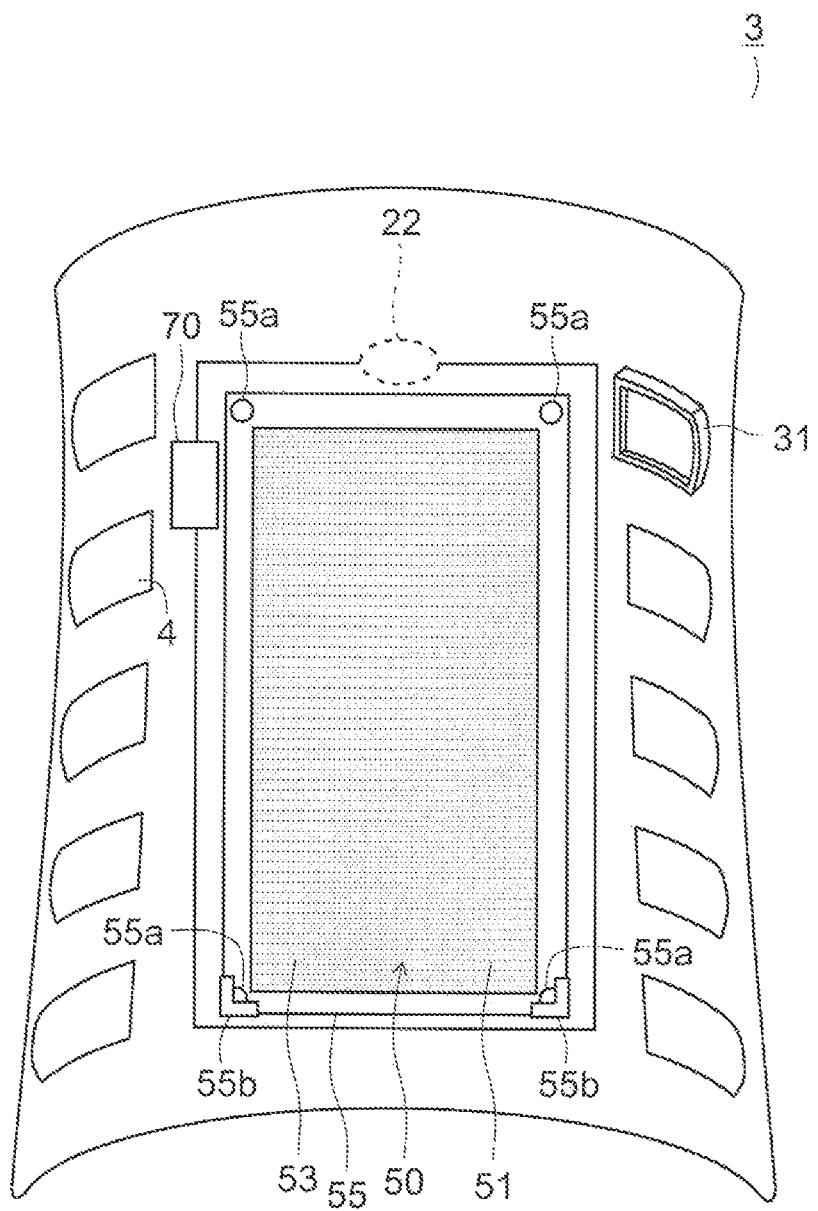
FIG. 4 is a perspective view showing a cover member of the blowing device of the first embodiment of the present invention.

FIG. 4 shows a perspective view of the cover member 3 as seen front an inner side (a casing 2 side). In the figure, an after-mentioned rib 31 is shown to be provided only on an uppermost one of the suction ports 4 on a right side, and for the other suction ports 4, depiction of the rib 31 is omitted. The cover member 3 has an engagement piece (not shown) that is engaged with an engagement hole (not shown) provided through the casing 2. Thus, the cover member 3 is demountably mounted with respect to the casing 2. The cover member 3 is bent so as to be convex rearward, and a plurality in this embodiment, five) of the suction ports 4 are juxtaposed vertically in each of both left and right end portions of the cover member 3.

Figure 5:
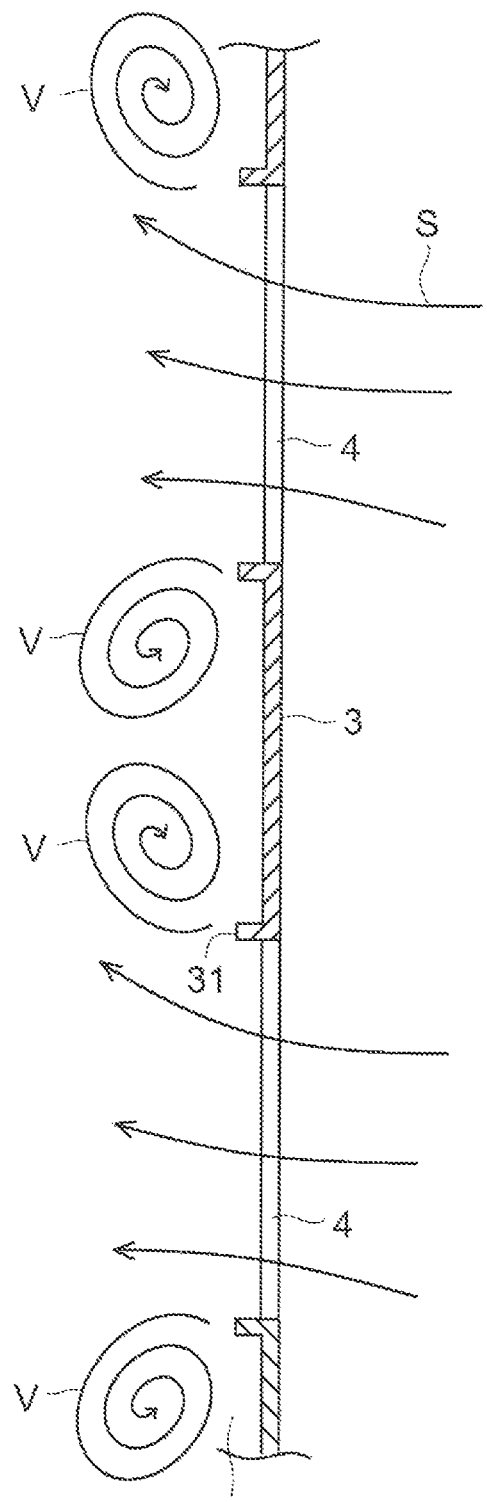
FIG. 5 is a longitudinal sectional view of the cover member of the blowing device of the first embodiment of the present invention, which passes through suction ports.

FIG. 5 shows a longitudinal sectional view of the cover member 3 at a position thereon passing through the suction ports 4, in the figure, a right side and a left side with respect to the cover member 3 represent an outer side and an inner side of die cover member 3, respectively. The annular rib 31 that protrudes toward the inner side (the casing 2 side) of the cover member 3 is arranged at a circumferential edge of each of the suction ports 4. When the blower 10 is driven to cause air to flow into the insect catching space 25 through the suction ports 4 as shown by an arrow S, by the rib 31, a vortex V is formed between the suction ports 4 on the inner surface of the cover 3.

In FIG. 4, in a concave portion 35 (see FIG. 2) provided in all upper portion of an outer surface of the cover member 3, an attraction light source 22 that emits insect-attracting light is disposed. Similarly to the attraction light source 21, the attraction light source 22 has an ultraviolet light emitting diode LD1 (see FIG. 9), and light emitted from the attraction light source 22 is diffused and reflected on a reflection plate not shown) and then travels toward the exterior of the blowing device 1 via an opening portion 35*a* (see FIG. 2). This can prevent a user from directly seeing the attraction light source 22.

Figure 6:
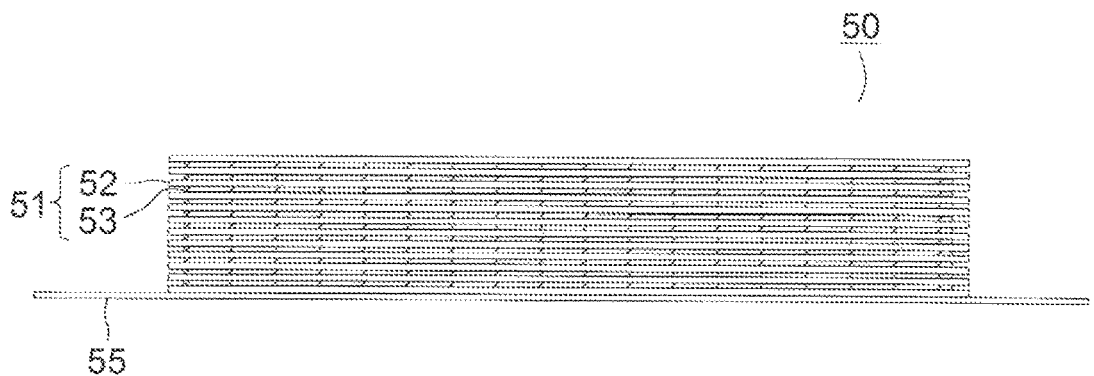
FIG. 6 is a side view showing an insect catching portion of the blowing device of the first embodiment of the present invention.

FIG. 6 shows a side view of the insect catching portion 50. The insect catching portion 50 is formed by stacking, via a release agent (not shown) such as silicone, a plurality of insect catching sheets 51 each formed of a base material sheet 52 with an adhesive 53 applied on one surface thereof, and a laminate thus obtained is bonded onto a mounting plate 55. The base material sheet 52 is formed of, for example, a sheet of paper, a resin film, or the like. The adhesive 53 is not particularly limited and, for example, an acrylic-based adhesive or the like can be used as the adhesive 53.

Figure 7:
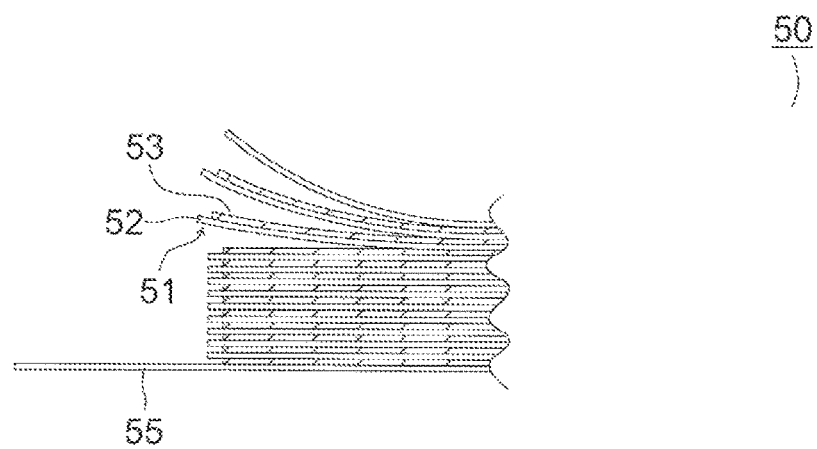
FIG. 7 is a side view of the insect catching portion of the blowing device of the first embodiment of the present invention, showing a state where an insect catching sheet is peeled off.

FIG. 7 shows a side view of the insect catching portion 50 in a state where one of the insect catching sheets 51 is peeled off. The insect catching sheets 51 are stacked via the release agent, and thus a used one of the insect catching sheets 51, to which insects have adhered to the adhesive 53, is peeled off. Thus, an unused one of the insect catching sheets 51 is exposed.

As shown in FIG. 4, engagement holes 55a are provided at four corners of the mounting plate 55, respectively, in an upper portion of the inner surface of the cover member 3, a pair of left and right hook-shaped engagement pieces (not shown) that protrude toward the casing 2 are provided. In a lower portion of the inner surface of the cover member 3, a pair of left and right support portions 55b are provided, each of which is L-shaped in front view and has a groove (not shown) for inserting the mounting plate 55 thereinto.

Corresponding ones of the engagement holes 55a of the mounting plate 55 are engaged with the engagement pieces at the cover member 3, respectively, and, left and right end portions of a lower end portion of the mounting plate 55 are placed in the support portions 55b, respectively, so that the insect catching portion 50 is demountably mounted to the inner surface of the cover member 3. Furthermore, the engagement holes 55a are provided on upper and lower sides, and thus the insect catching portion 50 can be mounted so as to be able to be inverted in an up-down direction. This allows an entire surface of each of the insect catching sheets 51 to be used effectively and thus can eliminate waste.

Furthermore, as shown in FIG. 4, an odor generation portion 70 that generates an insect-attracting odor substance is provided on the inner surface of the cover member 3. The odor substance is not particularly limited, and examples thereof include lactic acid. Lactic acid can easily attract mosquitoes. An installation location of the odor generation portion 70 is not limited to the inner surface of the cover member 3, and as long as the installation location is within the insect catching space 25, the odor generation portion 70 may be provided on the rear surface of the casing 2.

A configuration may also be adopted in which the base material sheet 52 of each of the insect catching sheets 51 contains an odor substance, thus forming an odor generation portion. Furthermore, a configuration may also be adopted in which the adhesive 53 and an odor substance are applied adjacently to each other in a staggered pattern or a striped pattern on the base material sheet 52, thus forming an odor generation portion. Furthermore, a configuration may also be adopted in which the adhesive 53 of each of the insect catching sheets 51 contains an odor substance, thus forming an odor generation portion. That is, an odor generation portion may be formed by providing an odor substance in each of the insect catching sheets 51. Furthermore, an odor generation portion may be formed by applying an odor substance on the mounting plate 55.

Figure 8:
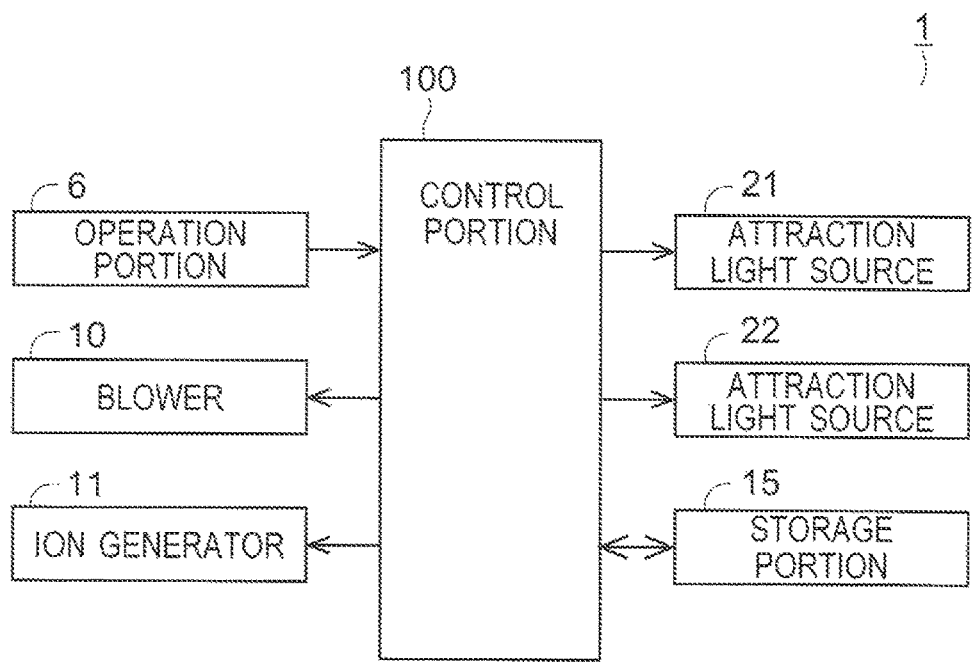
FIG. 8 is a block diagram showing a configuration of the blowing device of the first embodiment of the present invention.

FIG. 8 is a block diagram showing a configuration of the blowing device 1. The blowing device 1 has a control portion 100 that controls various portions. A storage portion 15, the operation portion 6, the blower 10, the ion generator 11, the attraction light sources 21 and 22 are connected to the control portion 100. The storage portion 15 stores a control program for the blowing device 1 and also stores a result of an arithmetic operation by the control portion 100 and so on. Furthermore, when the cover member 3 is mounted to the casing 2, power is supplied from the casing 2 side to the attraction light source 22 via connectors 21f and 21g (see FIG. 9).

Figure 9:
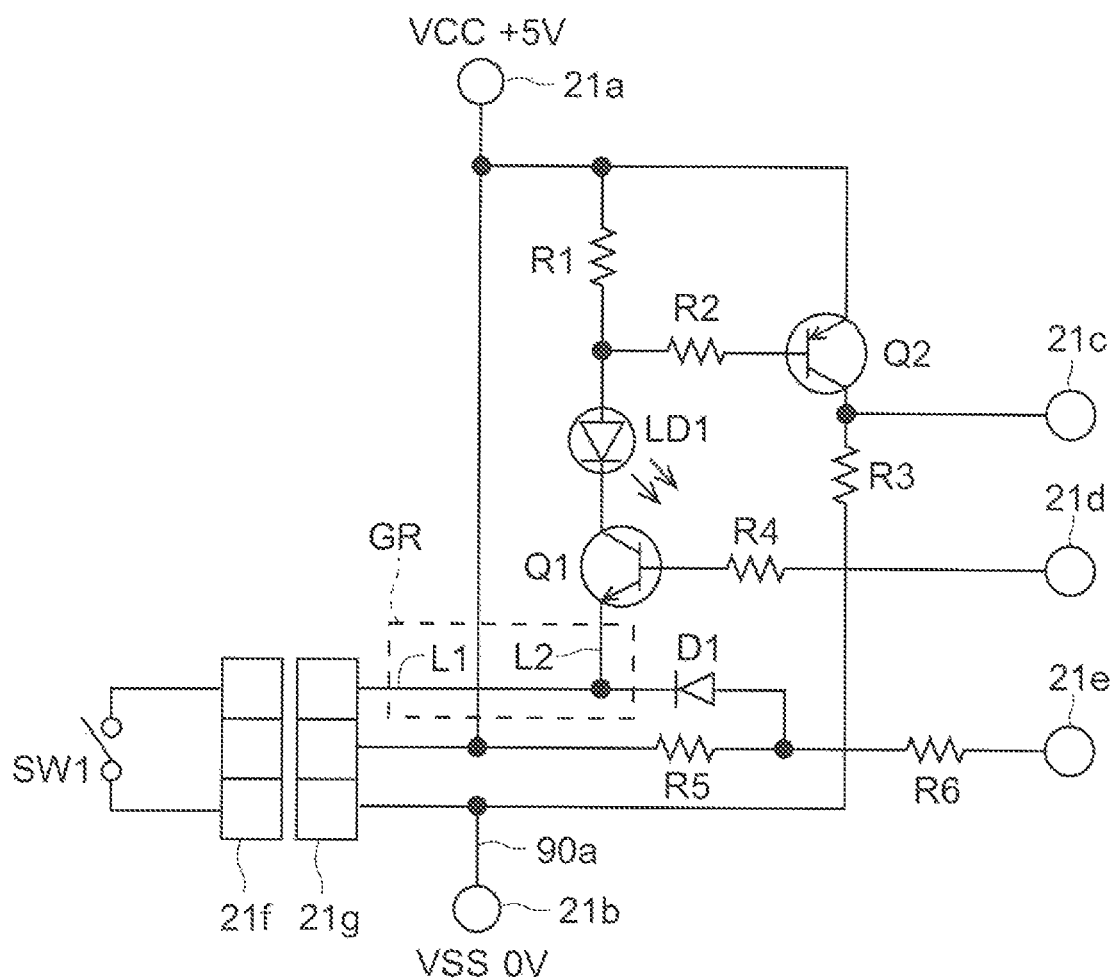
FIG. 9 is a circuit diagram showing a drive circuit that drives an attraction light source in the blowing device of the first embodiment of the present invention.

FIG. 9 is a circuit diagram showing a drive circuit of the attraction light source 21. A drive circuit of the attraction light source 22 is also configured similarly to the drive circuit of the attraction light source 21. The drive circuit of the attraction light source 21 has terminals 21a and 21b connected to a power source circuit not shown). A voltage of +5 V is inputted to the terminal 21a, while the terminal 21b is maintained at a ground potential, and a ground wire 90a is connected thereto. Between the terminals 21a and 21b, the ultraviolet light emitting diode LD1 is connected via the connector 21f on the cover member 3 side, the connector 21g on the casing 2 side, and a switch SW1, and a transistor Q2 is connected via a resistor R3 in parallel with the ultraviolet light emitting diode LD1. A terminal 21c is connected between a collector of the transistor Q2 and the resistor R3. A monitor circuit (not shown) that monitors the drive circuit is connected to the terminal 21c.

One end of each of resistors R1 and R2 is connected to an anode of the ultraviolet light emitting diode LD1. The other end of the resistor R1 is connected between the terminal 21a and an emitter of the transistor Q2, and the other end of the resistor R2 is connected to a base of the transistor Q2. A cathode of the ultraviolet light emitting diode LD1 is connected to a collector of a transistor Q1. A base of the transistor Q1 is connected to one end of a resistor R4, and the other end of the resistor R4 is connected to a terminal 21d. A drive control circuit (not shown) that controls the drive circuit is connected to the terminal 21d.

An emitter of the transistor Q1 is connected between the connector 21g and a cathode of a diode D1. An anode of the diode D1 is connected between one end of a resistor R5 and one end of a resistor R6. The other end of the resistor R5 and the other end of the resistor R6 are connected to the connector 21g and a terminal 21e, respectively. A detection circuit (not shown) that detects whether the cover member 3 is opened or closed is connected to the terminal 21e.

Furthermore, a guard ring GR is provided on an emitter side of the transistor Q1 and on a cathode side of the diode D1. The guard ring GR encircles a conductor wire L1 that links the connector 21g to the cathode of the diode D1 and a conductor wire L2 that links the conductor wire L1 to the emitter of the transistor Q1. The guard ring GR is made of, for example, copper foil and formed to be at a potential equal to a potential of the conductor wires L1 and L2. This can prevent the drive circuit from malfunctioning.

When, in a state where the cover member 3 is mounted to the casing 2, a voltage of DC 5 V is applied between the terminals 21a and 21b via the power source circuit, ultraviolet light is emitted from the ultraviolet light emitting diode LD1. In this case, when the cover member 3 is demounted from the casing 2, the connector 21f and the connector 21g are separated from each other, so that power supply to the ultraviolet light emitting diode LD1 is shut off. This can reduce health hazards caused by directly seeing ultraviolet light.

When, in a state where the cover member 3 is mounted to the casing 2, the blowing device 1 is driven to apply a voltage of DC 5 V between the terminals 21a and 21b via the power source circuit, unless there is an abnormality in the ultraviolet light emitting diode LD1, the transistors Q1 and Q2 are brought into an on state. Thus, an abnormality detection signal to be inputted to the terminal 21c assumes a high level.

On the other hand, when the ultraviolet light emitting diode LD1 is brought into, for example, an open state or a short-circuited state due to occurrence of an abnormality therein, the base of the transistor Q2 is not supplied with a sufficient bias voltage, and thus the transistor Q2 is brought into an off state. Thus, an abnormality detection signal to be inputted to the terminal 21c turns to a low level, so that the abnormality in the ultraviolet light emitting diode LD1 is detected. That is, an operation state of the ultraviolet light emitting diode LD1 can be monitored by the monitor circuit connected to the terminal 21c.

Further, upon detection of an abnormality in the ultraviolet light emitting diode LD1, power supply to the ultraviolet light emitting diode LD1 is shut off by the drive control circuit, and driving of the blower 10 and the ion generator 11 is stopped by the control portion 100. This can improve safety of the blower device 1. At this time, a warning in the form of a buzzer sound or the like may be issued.

Figure 10:
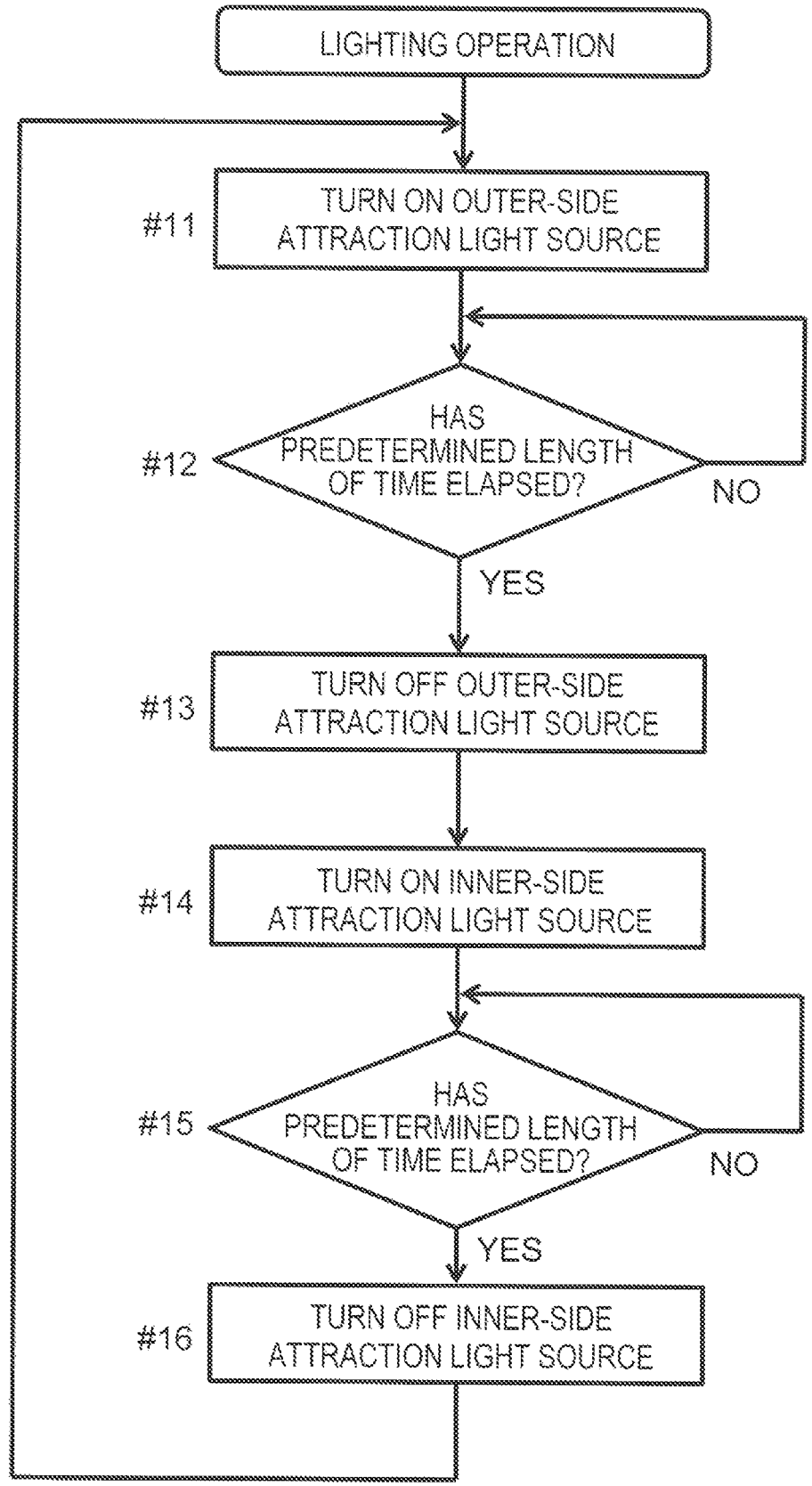
FIG. 10 is a flow chart showing a lighting operation of the attraction light source in the blowing device of the first embodiment of the present invention.

FIG. 10 is a flow chart showing a lighting operation of the attraction light sources 21 and 22. In the blowing device 1 configured as above, when the operation portion 6 is operated to instruct an operation of the blowing device 1, the blower 10 is driven, and a lighting operation of the attraction light sources 21 and 22 is started. At Step #11, the attraction light source 22 on an outer side is lit. At Step #12, a stand-by state is retained until a predetermined length of time (for example, 30 minutes) has elapsed. After a lapse of the predetermined length of time, a transition is made to Step #13 where the attraction light source 22 is extinguished.

At Step #14, the attraction light source 21 on an inner side is lit. At Step #15, a stand-by state is retained until a predetermined length of time has elapsed. After a lapse of the predetermined length of time, a transition is made to Step #16 where the attraction light source 21 is extinguished. After Step #16, a return is made to Step #11, and process steps at Step #11 to Step #16 are repeatedly performed.

At this time, emission light from the attraction light source 22 is diffused and reflected on the reflection plate and then travels toward the exterior of the blowing device 1. Furthermore, by the reflection surface 61a, emission light from the attraction light source 21 is diffused and reflected toward the suction ports 4. This prevents a user from directly seeing the attraction light sources 21 and 22 and thus can reduce an impact of ultraviolet light of the attraction light sources 21 and 22 on the user's health. Furthermore, the attraction light sources 21 and 22 are alternately lit at every lapse of a predetermined length of time, and thus an insect found far away from the blowing device 1 is attracted by the attraction light source 22 to the blowing device 1 and then can be easily guided by the attraction light source 21 into the insect catching space 25.

The blower 10 is driven to cause air in a room to flow into the insect catching space 25 via the suction ports 4. At this time, an insect that has entered the insect catching space 25 gets caught up in a vortex V (see FIG. 5) firmed between the suction ports 4 on the inner surface of the cover member 3 by the annular rib 31. This can prevent insects from escaping out of the insect catching space 25. Insects in the insect catching space 25 are caught by the insect catching portion 50.

Air that has flowed into the insect catching space 25 flows through the inflow port 20 of the casing 2 into the blowing passage 7. At this time, large-sized particles of dust in the air are collected by the pre-filter 8. Furthermore, fine particles of dust in the air including PM 2.5 or the like are collected by the HEPA filter 9. Air flowing through the blowing passage 7 on an exhaust side of the blower 10 contains ions generated by the ion generator 11. The ion-containing air from which dust has been collected is discharged through the blow-off port 5. Thus, air in a room can be purified.

When the blowing device 1 is in use, insects adhere to the adhesive 53 of an exposed one of the insect catching sheets 51 of the insect catching portion 50. In this case, when a user demounts the cover member 3 from the casing 2 and peels off the used one of the insect catching sheets 51, to which the insects have adhered, an unused one of the insect catching sheets 51 is exposed. This saves the trouble of replacing the insect catching sheets 51 and thus can improve convenience of the blowing device 1.

According to this embodiment, the insect catching portion 50 arranged on the inner surface of the cover member 3 having a plurality of openings formed therethrough as the suction ports 4 is formed by stacking, via a release agent, the plurality of insect catching sheets 51 each formed of the base material sheet 52 with the adhesive 53 applied on one surface thereof. By this configuration, when a used one of the insect catching sheets 51, to which insects have adhered, is peeled off, an unused one of the insect catching sheets 51 is exposed. This can improve convenience of the blowing device 1.

Furthermore, the plurality of suction ports 4 are juxtaposed vertically, with the attraction light source 21 disposed above the suction ports 4, and the reflection portion 61 is provided that diffuses and reflects emission light from the attraction light source 21 toward the suction ports 4. By this configuration, insects can be easily attracted to the insect catching space 25. Furthermore, this prevents a user from directly seeing the attraction light source 21 and thus can reduce an impact of ultraviolet light of the attraction light source 21 on the user's health.

The attraction light source 21 may be mounted, instead of in the casing 2, on the inner surface of the cover member 3. By this configuration, insects are attracted to the insect catching portion 50, and thus it is possible to more reliably catch insects by the insect catching portion 50. Furthermore, the attraction light source 21 may be mounted in both of the casing 2 and the cover member 3.

Furthermore, timing for lighting the attraction light source 21 is different from timing for lighting the attraction light source 22, and thus an insect found far away from the blowing device 1 is attracted by the attraction light source 22 to the blowing device 1 and then can be easily guided by the attraction light source 21 into the insect catching space 25. A configuration may also be adopted in which timing for lighting the attraction light source 21 is the same as timing for lighting the attraction light source 22.

Furthermore, the annular rib 31 that protrudes toward the inner side of the cover member 3 is provided at a circumferential edge of each of the suction ports 4, and when the blower 10 is driven, by the rib 31, the vortex V is formed between the suction ports 4 on the inner surface of the cover member 3. By this configuration, insects get caught up in the vortex V, and thus it is possible to prevent insects from escaping out of the insect catching space 25.

For example, each of the suction ports 4 may be provided with a lattice-shaped grille. By this configuration, a vortex can be generated also in each of the suction ports 4 downstream of the grille, and thus it is possible to more easily prevent insects from escaping out of the insect catching space 25.

Furthermore, the odor generation portion 70 that generates an insect-attracting odor substance is provided on the inner surface of the cover member 3. By this configuration, it is possible to more easily attract insects to the insect catching space 25. Furthermore, even when driving of the blowing device 1 is stopped, it is still possible to attract insects to the insect catching space 25 by the odor generation portion 70.

Second Embodiment

Figure 11:
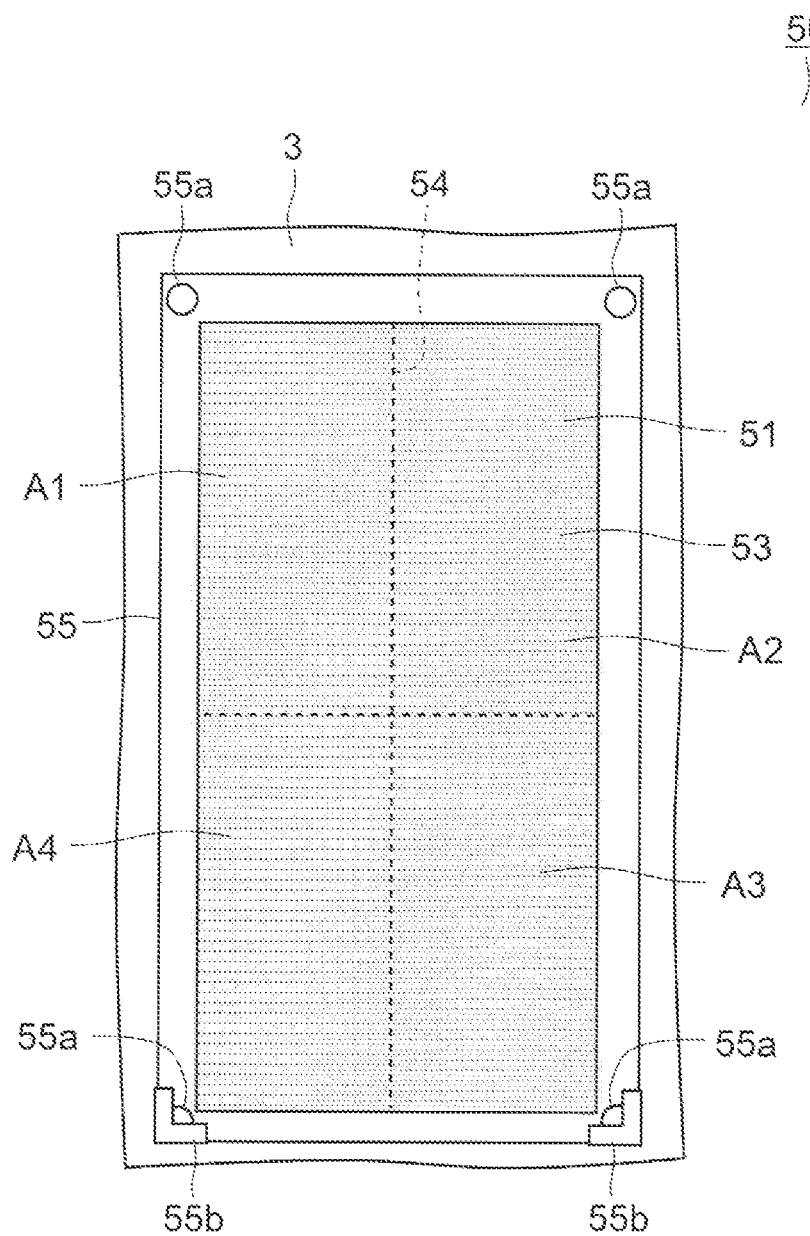
FIG. 11 is a front view showing an insect catching portion of a blowing device of a second embodiment of the present invention.

Next, a description is given of a second embodiment of the present invention. FIG. 11 shows a front view of an insect catching portion of a blowing device of the second embodiment. For the sake of convenience of description, portions similar to the previously mentioned portions in the first embodiment, which are shown in FIG. 1 to FIG. 10, are denoted by the same reference characters as in the first embodiment. This embodiment is different from die first embodiment in terms of a configuration of an insect catching portion 50. Other portions are configured similarly to those in the first embodiment.

An insect catching sheet 51 of the insect catching portion 50 has a line-shaped cut 54 to divide the insect catching sheet 51 so that the insect catching sheet 51 can be peeled off region by region. The cut 54 is formed to extend, in the middle in a left-right direction, from an upper end over to a lower end, and in the middle in an up-down direction, from a left end over to a right end of the insect catching sheet 51. By this configuration, the insect catching sheet 51 is firmed so that it can be divided by the cut 54 into four regions A1 to A4 that have the same rectangular shape and are substantially equal in area.

For example, in a case where more insects have adhered to the region A1 than to the regions A2 to A4, only a portion of the insect catching sheet 51, which corresponds to the region A1, is peeled off along the cut 54 so that only an unused portion of the insect catching sheet 51, which corresponds to the region A1, can be exposed. This can eliminate waste of the insect catching sheet 51 and thus can achieve a cost reduction.

Furthermore, the regions A1 to A4 have the same shape and are substantially equal in area, and thus, for example, in a case where a frequency of replacing a portion of the insect catching sheet 51, which corresponds to the region A1, is higher than frequencies of replacing portions of the insect catching sheet 51. Which correspond to the regions A2 to A4, respectively, it is possible to peel off, for example, the portion of the insect catching sheet 51, which corresponds to the region A3, from the region A3 along the cut 54 and bond it to the region A1. This can eliminate waste of the insect catching sheet 51 and thus can achieve a cost reduction.

While, in this embodiment, the insect catching sheet 51 is configured to be able to be divided into four regions by the cut 54, the insect catching sheet 51 may be configured to be able to be divided into, for example, two or six regions. Furthermore, the cut 54 may be formed in the insect catching sheet 51 so that the regions A1 to A4 vary in shape and area.

This embodiment can also provide a similar effect to that obtained by the first embodiment. Furthermore, the insect catching sheet 51 has the cut 54 to divide the insert catching sheet 51 so that the insect catching sheet 51 can be peeled off region by region, and thus it is possible to eliminate waste of the insect catching sheet 51 and thus to achieve a cost reduction.

Third Embodiment

Figure 12:
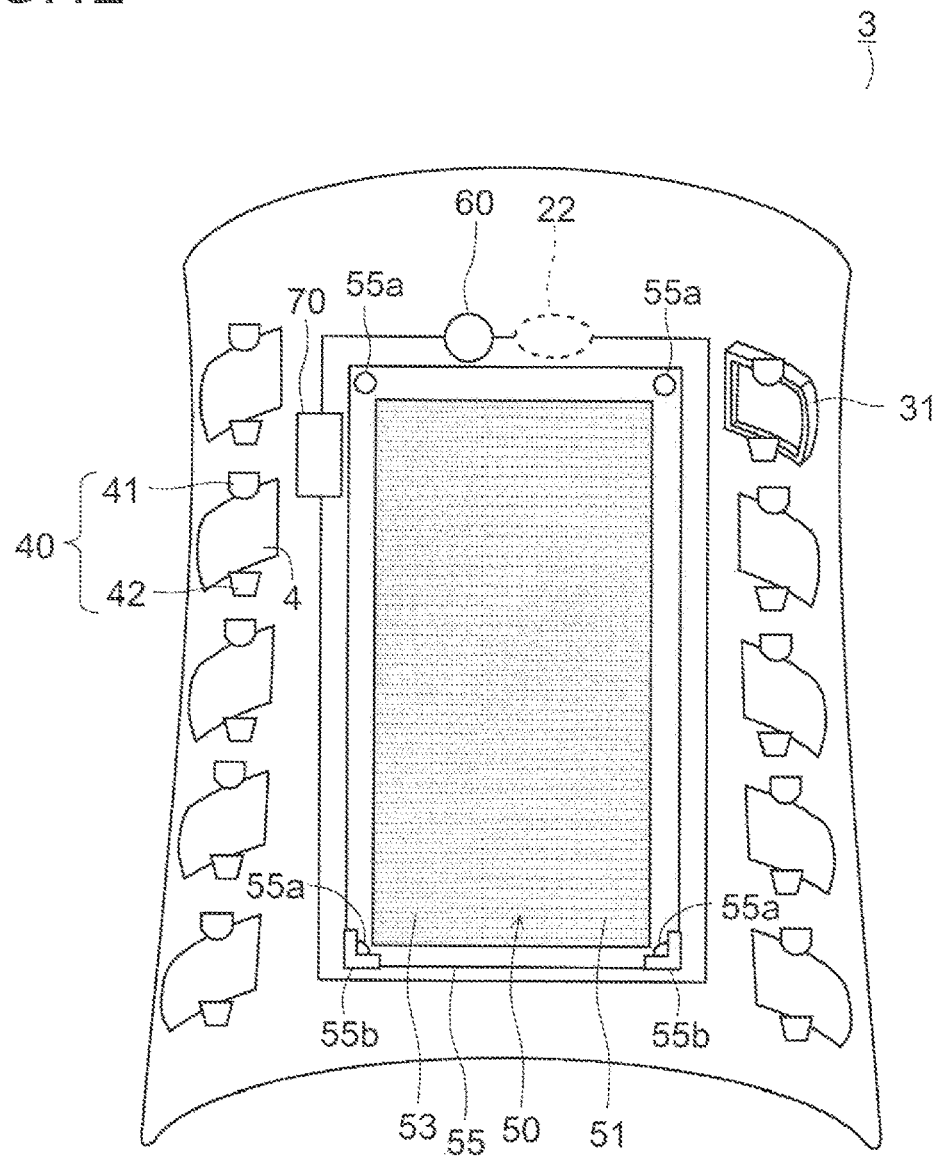
FIG. 12 is a perspective view showing a cover member of a blowing device of a third embodiment of the present invention.
Figure 13:
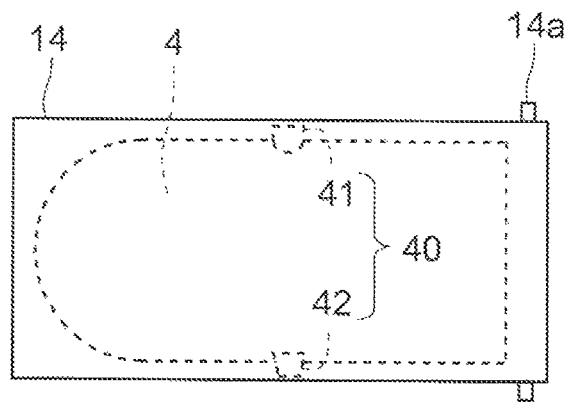
FIG. 13 is a front view showing an open/close plate of the cover member of the blowing device of the third embodiment of the present invention.

Next, a description is given of a third embodiment of the present invention. FIG. 12 shows a perspective view of a cover member of a blowing device of this embodiment, and FIG. 13 shows a front view of an open/close plate of the cover member. FIG. 12 shows a view of a cover member 3 as seen from an inner side. For the sake of convenience of description, portions similar to the previously mentioned portions in the first embodiment, which are shown in FIG. 1 to FIG. 10, are denoted by the same reference characters as in the first embodiment. This embodiment is different from the first embodiment in that a detection sensor 40, an open/close plate 14, and a spray portion 60 are provided. Other portions are configured similarly to those in the first embodiment.

Figure 14:
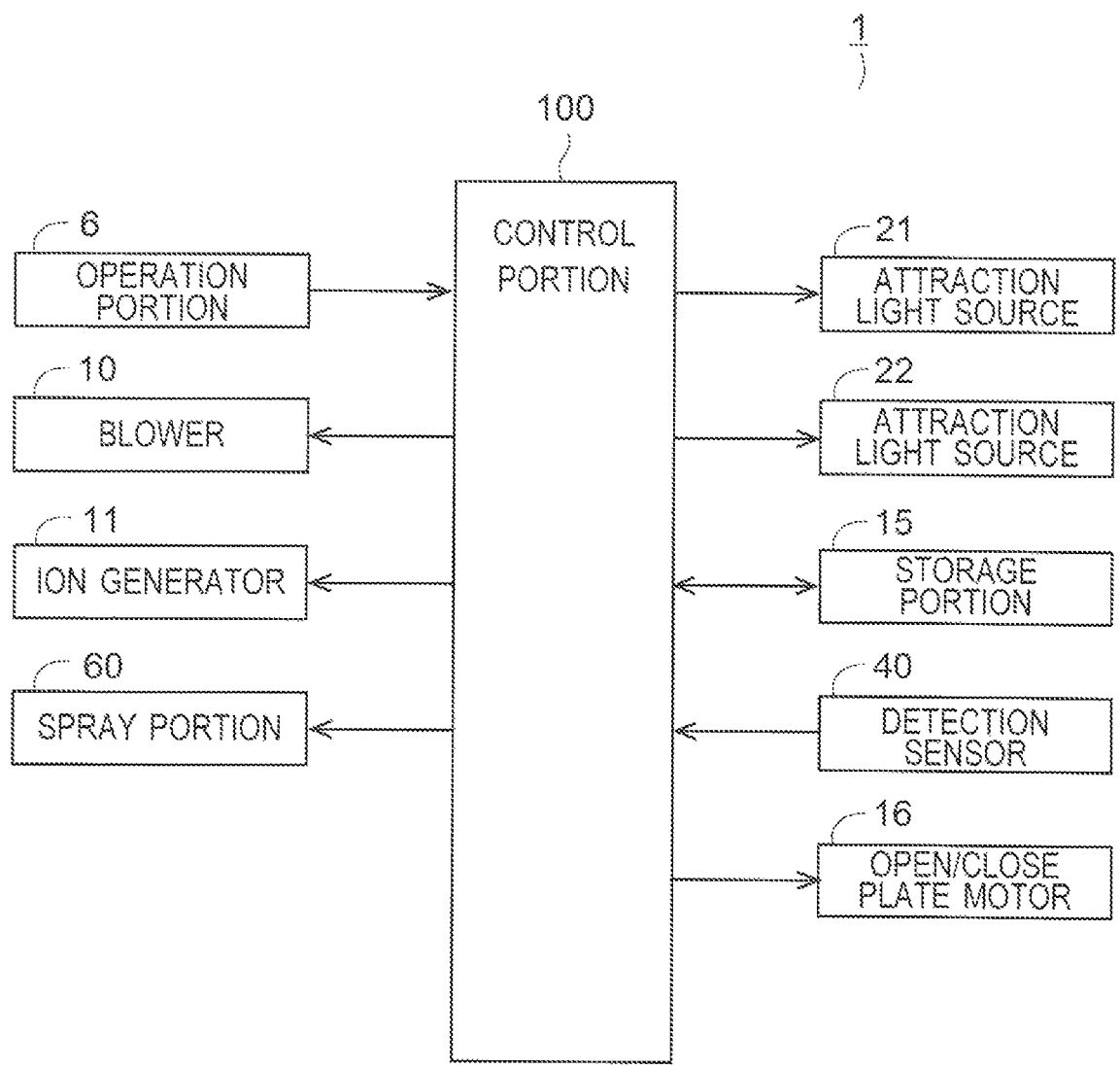
FIG. 14 is a block diagram showing a configuration of the blowing device of the third embodiment of the present invention.

Each of suction ports 4 is provided with the open/close plate 14 that opens/closes the each of suction ports 4. The open/close plate 14 is formed of a flat plate and supported by a swiveling axis portion 14a provided at one end portion of the open/close plate 14 so that it can swivel in a left-right direction. An open/close plate motor 16 (see FIG. 14) is linked to the swiveling axis portion 14a, and the open/close plate motor 16 is driven to open/close the open/close plate 14. The open/close plate 14 may be supported so that it can swivel in an up-down direction. Furthermore, a configuration may also be adopted in which the open/close plate 14 is moved in a sliding manner to open/close each of the suction ports 4.

The detection sensor 40 is provided in a vicinity of each of the suction ports 4. The detection sensor 40 is formed of an optical sensor having a light emitting element 41 and a light receiving element 42, and the light emitting element 41 and the light receiving element 42 are disposed so as to interpose each of the suction ports 4 there between. When an insect such as a mosquito or a fly passes through any of the suction ports 4, emission bat from the light emitting element 41 is obstructed, and thus the insect passing through the any of the suction ports 4 is detected based on an output of the light receiving element 42.

The spray portion 60 is provided in an upper portion of an inner side of the cover member 3. The spray portion 60 has a tank (not shown) filled with an insecticide and sprays the insecticide into art insect catching space 25 (see FIG. 2). The spray portion 60 is only required to be able to spray the insecticide into the insect catching space 25 and thus may also be provided in a casing 2 instead of in the cover member 3.

FIG. 13 is a block diagram showing a configuration of a blowing device 1. A storage portion 15, an operation portion 6, a blower 10, an ion generator 11 attraction light sources 21 and 22, the detection sensor 40, the open/close plate motor 16, and the spray portion 60 are connected to a control portion 100, and these various portions are controlled by the control portion 100. The storage portion 15 stores a control program for the blowing device 1 and also stores a result of an arithmetic operation by the control portion 100 and a result of detection by the detection sensor 40 or the like. Furthermore, when the cover member 3 is mourned to the casing 2, power is supplied from a casing 2 side to the attraction light source 22, the detection sensor 40, the open/close plate motor 16, and the spray portion (0 via connectors 21f and 21g (see FIG. 9).

Figure 15:
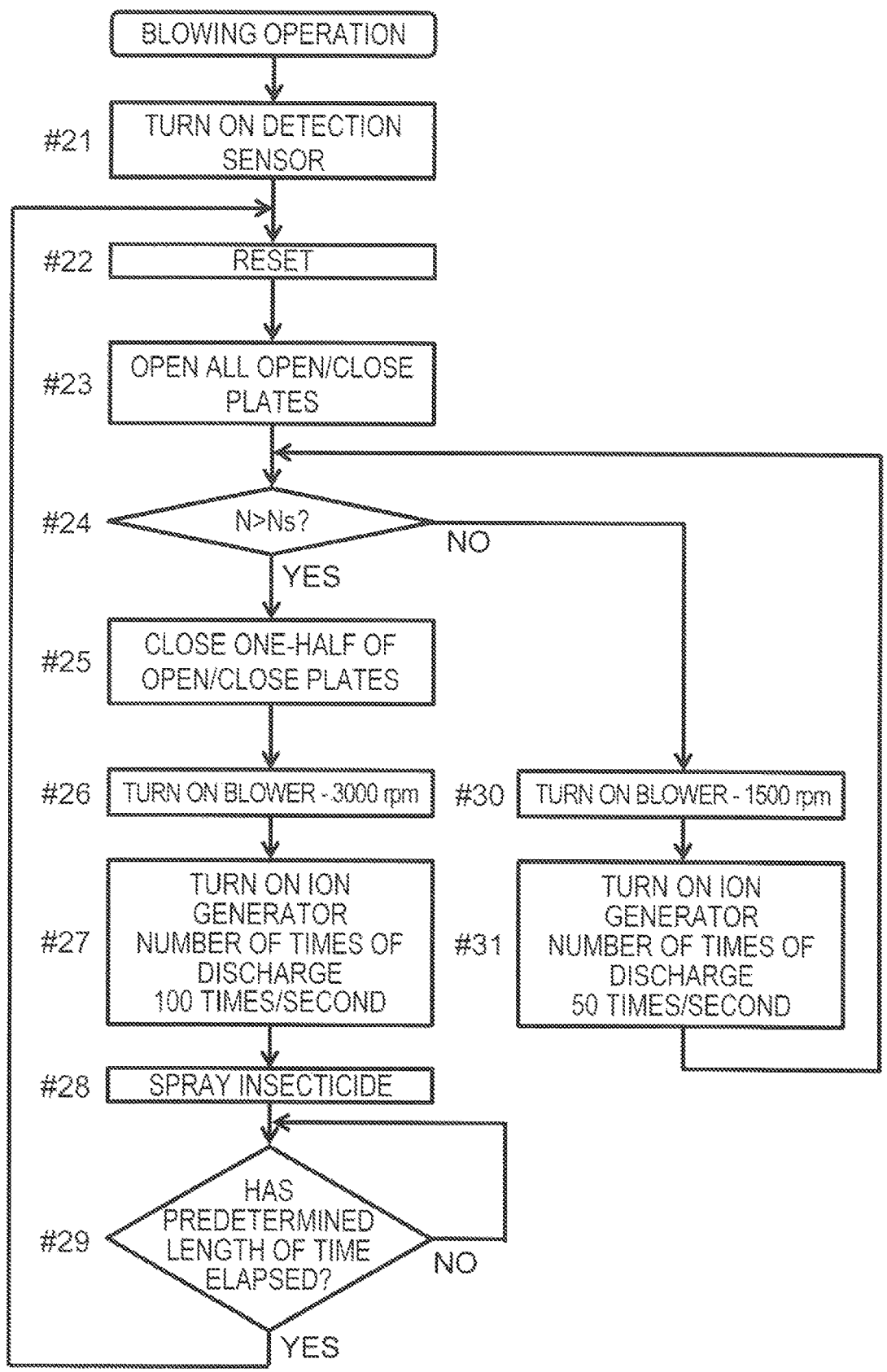
FIG. 15 is a flow chart showing a blowing operation of the blowing device of the third embodiment of the present invention.

FIG. 15 is a flow chart showing a blowing operation of the blowing device 1. When the operation portion 6 is operated to instruct an operation of the blowing device 1, the blowing operation shown in this figure and the previously mentioned lighting operation of the attraction light sources 21 and 22 shown in FIG. 10 are performed simultaneously.

At Step #21 the detection sensor 40 is driven. At Step #22, the number of insects counted by the detection sensor 40 is reset. At Step #23, all the open/close plates 14 are opened to open the suction ports 4. At Step #24, it is judged whether or not a number N of insects that have passed through the suction ports 4 within a predetermined length of time (for example, 4 hours) has exceeded a predetermined upper limit value Ns (for example, 50).

In a case where the number N of insects has exceeded the upper limit value Ns, a transition is made to Step #25, and in a case where the number N of insects has not exceeded the upper limit value Ns, a transition is made to Step #30. At Step #30, the blower 10 is driven at a rotational speed of, for example, 1500 rpm. At Step #31, the ion generator 11 is driven, for example, under conditions that an application voltage is 2 kV and a number of times of discharge is 50 times per second. Thus, the first blowing mode is executed, and air in a room is caused to flow into the insect catching space 25 via the suction ports 4. After Step #31, a return is made to Step #24.

At Step #25, by one-half of the open/close, plates 14, corresponding ones of the suction ports 4 are closed. For example, by the open close plates 14, left-side ones of the suction ports 4 are all closed, and right-side ones of the suction ports 4 are all opened. At Step #26, the blower 10 is driven at a rotational speed of, for example, 3000 rpm. At Step #27, the ion generator 11 is driven, for example, under conditions that an application voltage is 2 kV and a number of times of discharge is 100 times per second. Thus, the second blowing mode is executed. That is, in the second blowing mode, the suction ports 4 are made smaller in opening area than in the first blowing mode, and a rotational speed of the blower 10 is set to be larger than in the first blowing mode.

By this configuration, in the second blowing mode, a suction force exerted via the suction ports 4 is made larger than in the first blowing mode, so thin it is possible to easily prevent insects in the insect catching space 25 from escaping to the exterior. Accordingly, it is possible to reliably catch insects by the insect catching portion 50.

Furthermore, with YES at Step #24, it is highly probable that there are a large number of insects in a room. According to this embodiment, in the second blowing mode, ions are discharged into a room in a larger quantity than in the first blowing mode. By this configuration, in a case where there are a large number of insects in a room, bacteria and so on carried into the room by the insects can be eradicated, and allergens derived from the insects can be inactivated.

At Step #28, an insecticide is sprayed from the spray portion 60 toward into the insect catching space 25. By this configuration, insects flying in the insect catching space 25 can be killed.

A configuration may also be adopted in which, in the second blowing mode, after the blower 10 is driven for a predetermined length of time, the blower 10 is stopped from operating for a predetermined length of time (for example, five minutes), and all the open/close plates 14 are closed, in which state an insecticide, is sprayed from the spray portion 60. By this configuration, an insecticide is filled its the insect catching space 25, and thus, an insect killing effect can be thither improved.

At Step #29, a stand-by state is retained until a predetermined length of time (for example, 30 minutes) has elapsed. After a lapse of the predetermined length of time, a return is made to Step #22, and process steps at Step #22 to Step #31 are repeatedly performed.

A configuration may also be adopted in which the detection sensor 40 is disposed also in a vicinity of the attraction light source 22, and at Step #12 in FIG. 10, instead of judging whether or not a predetermined length of time has elapsed, it is judged whether or not the number of insects that have passed through the vicinity of the attraction light source 22 has exceeded a predetermined upper limit value, and when the upper limit value is exceeded, a transition is made to Step #13.

According to this embodiment, a similar effect to that obtained by the first embodiment can be obtained. Furthermore, when, during execution of the first blowing mode, the number N of insects detected within a predetermined length of time by the detection sensor 40 has exceeded the predetermined upper value Ns, switching to the second blowing mode is performed. By this configuration, a suction force exerted via the suction ports 4 is made larger than in the first blowing mode, and thus it is possible to easily prevent insects in the insect catching space 25 from escaping to the exterior. Accordingly, it is possible to more reliably catch insects can by the insect catching portion 50.

Furthermore, in the second blowing mode, an insecticide is sprayed into the insect catching space 25 by the spray portion 60, and thus insects thing in the insect catching, space 25 can be easily exterminated. A configuration may also be adopted in which, in the first blowing mode, an insecticide is sprayed by the spray portion 60.

In this embodiment, a cut 54 similar to that in the second embodiment may be formed in each of insect catching sheets 51. Furthermore, a spray portion 60 similar to that in this embodiment may be provided in the blowing device 1 of the first embodiment.

Fourth Embodiment

Next, a description is given of a fourth embodiment of the present invention. This embodiment is different from the third embodiment in that, in place of the spray portion 60 in the third embodiment, a non-woven fabric, such as felt, impregnated with a volatile insecticide is disposed in an insect catching space 25. Other portions are configured similarly to those in the third embodiment.

In the second blowing mode, after a blower 10 is driven for a predetermined length of time, the blower 10 is stopped from operating for a predetermined length of time (for example, five minutes), and all open/close plates 14 are closed, so that the insecticide vaporized from the non-woven fabric can be filled in the insect catching space 25. By this configuration insects in the insect catching space 25 can be easily exterminated. Furthermore, the spray portion 60 can be omitted, and this avoids a complicated configuration of a blowing device 1 and thus can suppress an increase in manufacturing cost of the blowing device 1.

In this embodiment, a configuration may also be adopted in which, in place of a non-woven fabric, such as felt, impregnated with an insecticide, pellets impregnated with a volatile insecticide are housed in a container having an opening portion, and said container is disposed in the insect catching space 25. By this configuration, an insecticide can be slowly released in the insect catching space 25 by adjusting a size of the opening portion.

Furthermore, in the first embodiment to the fourth embodiment, the adhesive 53 of each of the insect catching sheets 51 may be water-soluble. Examples of materials of a water-soluble adhesive include dextrin, polyvinyl alcohol, polyvinyl pyrrolidone, starch, and gum arabic. By this configuration, the cover member 3 is demounted from the casing 2, and a surface of the adhesive 53 to which insects, dust, and so on have adhered can be washed off with water or the like. Accordingly, a frequency of replacing the insect catching sheets 51 can be decreased.

Furthermore, in the first embodiment to the fourth embodiment, the attraction light sources 21 and 22 may be omitted from the blowing device 1. Furthermore, while the first embodiment to the fourth embodiment have described, as an example, the blowing device 1 provided with the HEPA filter 9 and the ion generator 11, a configuration may also be adopted in which the HEPA filter 9 and the ion generator 11 are omitted, and the insect catching portion 50 is provided in a circulator that blows off air through the blow-off port 5 so that air is circulated in a room.

INDUSTRIAL APPLICABILITY

The present invention is applicable to a blowing device provided with an insect catching portion that catches insects.

LIST OF REFERENCE SYMBOLS 1 blowing device
2 casing
3 cover member
4 suction port
5 blow-off port
6 operation portion
7 blowing passage
8 pre-filter
9 HEPA filter
10 blower
11 ion generator
12 sleeve portion
14 open/close plate
20 inflow port
21, 22 attraction light source
31 rib
50 insect catching portion
51 insect catching sheet
52 base material sheet
53 adhesive
54 cut
55 mounting plate
60 spray portion
61 reflection portion
61a reflection surface

The invention claimed is:

1. A blowing device, comprising:
a casing that has openings as an air inflow port and an air blow-off port formed through the casing and includes a blower in the casing;
a cover member extending along a side surface of the casing, the cover being demountably mounted to the casing so as to cover the inflow port and having a plurality of openings each formed along the side surface of the casing as an air suction port; and
an insect catching portion that is arranged on an inner surface of the cover member and catches insects,
wherein
the insect catching portion is formed by stacking, via a release agent, a plurality of insect catching sheets each formed of a base material sheet with an adhesive applied on one surface of the base material sheet.

2. The blowing device according to claim 1, wherein each of the insect catching sheets has a cut to divide the each of the insect catching sheets so that the each of the insect catching sheets can be peeled off region by region.

3. The blowing device according to claim 1, further comprising:
a first attraction light source that emits light for attracting insects to an insect catching space between the suction port and the inflow port,
wherein a plurality of the suction ports j juxtaposed vertically, and the first attraction light source is disposed above the suction ports, and
a reflection portion is provided that diffuses and reflects emission light from the first attraction light source toward the suction ports.

4. The blowing device according to claim 1, further comprising:
an annular rib that protrudes toward an inner side of the cover member and is provided at a circumferential edge of the suction port,
wherein when the blower is driven, by the rib, a vortex is formed between the suction ports on the inner surface of the cover member.

5. A blowing device, comprising:
a casing that has openings as an air inflow port and an air blow-off port formed through the casing and includes a blower in the casing;
a cover member demountably mounted to the casing so as to cover the inflow port and having a plurality of openings each formed along a side surface of the casing as an air suction port;
an insect catching portion that is arranged on an inner surface of the cover member and catches insects,
a first attraction light source that emits light for attracting insects to an insect catching space between the suction port and the inflow port; and
a second attraction light source that is arranged on an outer side of the cover member and emits light for attracting insects,
wherein
the insect catching portion is formed by stacking, via a release agent, a plurality of insect catching sheets each formed of a base material sheet with an adhesive applied on one surface of the base material sheet,
a plurality of the suction ports is juxtaposed vertically, and the first attraction light source is disposed above the suction ports,
a reflection portion is provided that diffuses and reflects emission light from the first attraction light source toward the suction ports, and
timing for lighting the first attraction light source is different from timing for lighting the second attraction light source.

6. A blowing device, comprising:
a casing that has openings as an air inflow port and an air blow-off port formed through the casing and includes a blower in the casing;
a cover member demountably mounted to the casing so as to cover the inflow port and having a plurality of openings each formed along the side surface of the casing as an air suction port;
an insect catching portion that is arranged on an inner surface of the cover member and catches insects;
a detection sensor that detects an insect passing through the suction port; and
an open/close plate that opens/closes the suction port,
wherein
the insect catching portion is formed by stacking, via a release agent, a plurality of insect catching sheets each formed of a base material sheet with an adhesive applied on one surface of the base material sheet,
there are provided a first blowing mode in which the blower is driven at a predetermined rotational speed and a second blowing mode in which, by the open/close plate, the suction port is made smaller in opening area than in the first blowing mode, and the blower is driven at a rotational speed larger than in the first blowing mode, and when, during execution of the first blowing mode, a number of insects detected within a predetermined length of time by the detection sensor has exceeded a predetermined value, switching to the second blowing mode is performed.

\* \* \* \* \*